(12) United States Patent
Inoue

(10) Patent No.: US 11,084,888 B2
(45) Date of Patent: Aug. 10, 2021

(54) PRODUCTION METHOD FOR LOW INCLUSION RATE POLYROTAXANE

(71) Applicant: ASM, Inc., Chiba (JP)

(72) Inventor: Katsunari Inoue, Chiba (JP)

(73) Assignee: ASM, Inc., Chiba (JP)

( * ) Notice: Subject to any disclaimer, the term of this patent is extended or adjusted under 35 U.S.C. 154(b) by 0 days.

(21) Appl. No.: 16/759,266

(22) PCT Filed: Oct. 23, 2018

(86) PCT No.: PCT/JP2018/039267
§ 371 (c)(1),
(2) Date: Apr. 24, 2020

(87) PCT Pub. No.: WO2019/082869
PCT Pub. Date: May 2, 2019

(65) Prior Publication Data
US 2020/0339709 A1    Oct. 29, 2020

(30) Foreign Application Priority Data

Oct. 24, 2017  (JP) .............................. JP2017-205554

(51) Int. Cl.
*C08B 37/16* (2006.01)

(52) U.S. Cl.
CPC ................. *C08B 37/0015* (2013.01)

(58) Field of Classification Search
None
See application file for complete search history.

(56) References Cited

U.S. PATENT DOCUMENTS

| | | | |
|---|---|---|---|
| 6,828,378 B2 | 12/2004 | Okumura et al. | |
| 2013/0296546 A1 | 11/2013 | Yamasaki et al. | |
| 2017/0349711 A1 | 12/2017 | Hayamizu et al. | |

FOREIGN PATENT DOCUMENTS

| | | |
|---|---|---|
| JP | 3475252 B2 | 9/2003 |
| JP | 2010-159313 A | 7/2010 |
| JP | 5051491 B2 | 8/2012 |
| WO | 2012081429 A1 | 6/2012 |
| WO | 2016/111353 A1 | 7/2016 |

OTHER PUBLICATIONS

Lo Nostro, J. Phys. Chem. B 2002, 106, 2166-2174. (Year: 2002).*

* cited by examiner

*Primary Examiner* — Layla D Berry
(74) *Attorney, Agent, or Firm* — Christensen O'Connor Johnson Kindness PLLC

(57) ABSTRACT

The present invention provides a production method for pseudo-polyrotaxane or polyrotaxane in which the degree of ring-shaped molecules included on straight-chain molecules, that is, the inclusion rate, has been controlled to be low and stable. The present invention provides a production method for polyrotaxane formed by blocking groups being positioned at both ends of a pseudo-polyrotaxane so ring-shaped molecules are not released, said pseudo-polyrotaxane being formed by ring-shaped molecules skewered through openings thereof by straight-chain molecules, wherein polyrotaxane is obtained by means of said method having: (A) a step for preparing straight-chain molecules which have acidic or basic functional groups on both ends; (B) a step for forming pseudo-polyrotaxane by means of having a step for mixing the straight-chain molecules, the ring-shaped molecules, and a first basic group or an acid addition salt (the acid addition salt is used when the straight-chain molecules have the acidic functional groups; a base addition salt is used when the straight-chain molecules have the basic functional groups); and (C) a step for providing blocking groups on both ends of the straight-chain molecules by means of having a step for mixing the obtained pseudo-polyrotaxane and a blocking group precursor.

18 Claims, 1 Drawing Sheet

PRODUCTION METHOD FOR LOW INCLUSION RATE POLYROTAXANE

TECHNICAL FIELD

The present invention relates to a method for producing a pseudopolyrotaxane in which a cyclic molecule is included in a linear molecule, and a method for producing a polyrotaxane in which capping groups are provided at both ends of the linear molecule of the pseudopolyrotaxane. In particular, the present invention relates to a method for producing pseudopolyrotaxanes or polyrotaxanes each having a so-called low inclusion rate.

BACKGROUND ART

Attentions are paid to a polyrotaxane since the polyrotaxane has a special structure in which a cyclic molecule is movable relatively to an axial molecule, and thus a polyrotaxane has been studied and developed.

As for the production method, various ones have been disclosed since the disclosure of Patent Document 1. Among them, there are several production methods that focus on a degree of inclusion of cyclic molecules in linear molecules, that is, an inclusion rate.

For example, Patent Document 2 discloses stabilization of production by adding a basic compound in an inclusion step, specifically, an effect of obtaining a constant inclusion rate regardless of the inclusion time between polyethylene glycol (PEG) and α-cyclodextrin (α-CD).

Further, Patent Document 3 discloses a method for producing a modified polyrotaxane comprising a modified cyclodextrin and a linear molecule having a number average molecular weight of 1500 or more, in which the coverage of the modified cyclodextrin is 80% or less. Furthermore, the term "coverage" in Patent Document 3 is considered to have a definition same as "inclusion rate".

More, Patent Document 4 discloses a method for producing a polyrotaxane having an inclusion rate of 0.06 to 0.17. Specifically, Patent Document 4 discloses a method characterized by dissolving PEG having a molecular weight of linear molecule of 1000 to 5000 and α-CD that is a cyclic molecule in a mixed solvent of dimethylformamide (DMF) and dimethyl sulfoxide (DMSO) of which the volume ratio is 75:25 to 80:20 in an end capping step.

However, a method for producing a pseudopolyrotaxane or polyrotaxane having a controlled inclusion rate has not yet been established, and development of a pseudopolyrotaxane or polyrotaxane, each of which has characteristics different from conventional characteristics, by controlling the inclusion rate has been expected.

The inclusion rate is considered to affect the degree of crosslinking of a crosslinked body of polyrotaxanes, and a crosslinked body of a polyrotaxane and another material. Therefore, for example, a crosslinked body using a polyrotaxane having a low inclusion rate has fewer crosslinking points, and it is expected to result in a change in the characteristics of the crosslinked body, in particular, result in a change in flexibility.

PRIOR ART DOCUMENT

Patent Document

Patent Document 1: JP Patent No. 3475252.
Patent Document 2: WO2006/111353.
Patent Document 3: JP-A-2010-159313.
Patent Document 4: JP Patent No. 5051491.

DISCLOSURE OF THE INVENTION

Problems to be Solved by the Invention

An object of the present invention is to provide a method for producing a pseudopolyrotaxane or a polyrotaxane, each having a controlled degree of inclusion of a cyclic molecule in a linear molecule, that is, a controlled inclusion rate.

Further, an object of the present invention is, in addition to the above object, to provide a production method which can stably obtain the pseudopolyrotaxane or the polyrotaxane, each having a controlled inclusion rate under each condition.

More, an object of the present invention is, in addition to, or other than the above objects, to provide a pseudopolyrotaxane or a polyrotaxane, each having a controlled inclusion rate.

Means for Solving Problems

The present inventor has found the following inventions:

<1> A method for producing a pseudopolyrotaxane, which has a linear molecule and a cyclic molecule(s) in which the linear molecule is included in a cavity (cavities) of the cyclic molecule(s) in a skewered manner, the method comprising the steps of:

(A) preparing a linear molecule having acidic or basic functional groups at both ends; and (B) mixing the linear molecule, a cyclic molecule(s), and a first base or acid additional salt (the first acidic additional salt in a case of the linear molecule having the acidic functional group, and the first base additional salt in a case of the linear molecule having the basic functional group); to form the pseudopolyrotaxane.

<2> A method for producing a polyrotaxane, in which capping groups each locates at each end of a pseudopolyrotaxane, which has a linear molecule and a cyclic molecule(s) in which the linear molecule is included in a cavity (cavities) of the cyclic molecule(s) in a skewered manner, in order to prevent the dissociation of the cyclic molecule(s), the method comprising the steps of:

(A) preparing a linear molecule having acidic or basic functional groups at both ends;

(B) mixing the linear molecule, a cyclic molecule(s), and a first base or acid additional salt (the first acidic additional salt in a case of the linear molecule having the acidic functional group, and the first base additional salt in a case of the linear molecule having the basic functional group), to form the pseudopolyrotaxane; and (C) mixing the resulting pseudopolyrotaxane and a capping group precursor(s); to obtain the polyrotaxane.

<3> In the above item <1> or <2>, a base component of the first base additional salt may be selected from triethylamine, pyridine, ammonia, morpholine, t-butylamine, ethylenediamine, sodium hydroxide, or potassium hydroxide.

<4> In the above item <1> or <2>, an acid component of the first acid additional salt may be obtained by selecting from an inorganic acid and an organic acid, the inorganic acid may be selected from hydrochloric acid, hydrobromic acid, hydroiodic acid, nitric acid, sulfuric acid, or phosphoric acid, and the organic acid may be selected from formic acid, acetic acid, trifluoroacetic acid, propionic acid, hydroxyacetic acid, 2-hydroxypropionic acid, pamoic acid, 2-oxopropionic acid, oxalic acid, malonic acid, succinic acid, fumaric acid, maleic acid, malic acid, tartaric acid, citric acid, benzoic acid, salicylic acid, phthalic acid, cinnamic acid, glycolic acid, pyruvic acid, oxylic acid, salicylic acid, N-acetylcysteine, 2-butenedioic acid, methanesulfonic acid, ethanesulfonic acid, benzenesulfonic acid and toluenesulfonic acid, aspartic acid, glutamic acid, butyric acid, valeric acid, enanthic acid, capric acid, myristic acid, palmitic acid, stearic acid, lactic acid, sorbic acid, or mandelic acid.

<5> In any one of the above items <1> to <4>, the first base or acid additional salt may be at least one selected from the group consisting of a base additional salt of adamantane carboxylic acid or an acid derivative thereof, a base additional salt of benzoic acid or a derivative thereof, a base additional salt of adamantane acetic acid or a derivative thereof, an acid additional salt of adamantane amine or a derivative thereof, an acid additional salt of adamantyl ethylenediamine, an acid additional salt of tritylamine, an acid additional salt of diisopropylethylamine, and an acid additional salt of triethylamine.

<6> In any one of the above items <1> to <5>, the linear molecule may comprise acidic functional groups at both ends.

<7> In any one of the above items <1> to <5>, the linear molecule may comprise basic functional groups at both ends.

<8> In the step (B) in the above item <6> or <7>, 2 to 50 molar equivalents, preferably 5 to 40 molar equivalents, more preferably 10 to 20 molar equivalents of the first base or acid additional salt may be mixed to the total molar equivalent of the acidic functional groups or the basic functional groups of the linear molecule.

<9> In any one of the above items <1> to <8>, the step (B) may be carried out in the presence of an aqueous solvent.

<10> In the step (C) in any one of the above items <1> to <9>, the capping group precursor(s) may be a second base or acid additional salt. The second base or acid additional salt may be the same as or different from the first base or acid additional salt.

<11> In any one of the above items <1> to <10>, the cyclic group may be at least one selected from cyclodextrins.

Effects of the Invention

The present invention can provide a method for producing a pseudopolyrotaxane or a polyrotaxane, each having a controlled degree of inclusion of a cyclic molecule in a linear molecule, that is, a controlled inclusion rate.

Further, in addition to the above effect, the present invention can provide a production method which can stably obtain the pseudopolyrotaxane or the polyrotaxane, each having a controlled inclusion rate under each condition.

More, in addition to, or other than the above effects, the present invention can provide a pseudopolyrotaxane or a polyrotaxane, each having a controlled inclusion rate.

EMBODIMENTS FOR CARRYING OUT THE INVENTION

Figure 1:
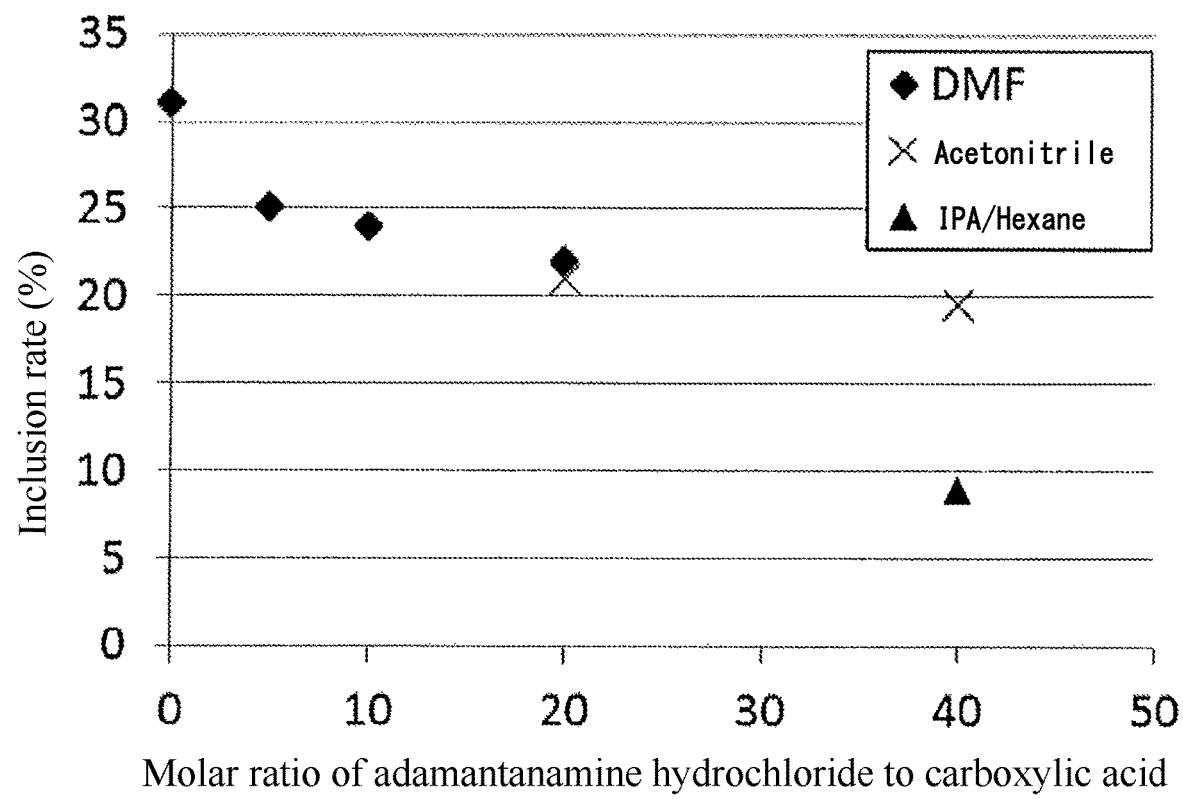
FIG. 1 shows a graph having "molar equivalent of hydrochloride against carboxylate group" as a vertical axis and "inclusion rate" as a horizontal axis for Examples 1 to 4.

The present application provides a method for producing a pseudopolyrotaxane or polyrotaxane, each having a controlled inclusion rate. Hereinafter, the present invention will be described in detail.

<Production Method of Pseudopolyrotaxane>

The present application provides a method for producing a pseudopolyrotaxane, which has a linear molecule and a cyclic molecule(s) in which the linear molecule is included in a cavity (cavities) of the cyclic molecule(s) in a skewered manner.

The method comprises the steps of:

(A) preparing a linear molecule having acidic or basic functional groups at both ends thereof; and (B) mixing the linear molecule, a cyclic molecule(s), and a first base or acid additional salt (the first acid additional salt in a case of the linear molecule having the acidic functional group, and the first base additional salt in a case of the linear molecule having the basic functional group), to form the pseudopolyrotaxane.

<<Step (A)>>

The step (A) is the step of preparing a linear molecule having acidic or basic functional groups at both ends.

(Linear Molecule)

The linear molecule is not limited as long as the linear molecule may be included in a cavity (cavities) of the cyclic molecule(s) in a skewered manner.

For example, the linear molecule may include polyvinyl alcohol, polyvinylpyrrolidone, poly(meth)acrylic acid, cellulose-based resins (carboxymethylcellulose, hydroxyethylcellulose, hydroxypropylcellulose and the like), polyacrylamide, polyethylene oxide, polyethylene glycol, polypropylene glycol, polyvinyl acetal-based resins, polyvinyl methyl ether, polyamine, polyethyleneimine, casein, gelatin, starch and the like and/or copolymers thereof, polyolefin-based resins such as polyethylene, polypropylene, and copolymer resins with other olefinic monomers, polyester resins, polyvinyl chloride resins, polystyrene-based resins such as polystyrene, acrylonitrile-styrene copolymer resin and the like, acrylic resins such as polymethyl methacrylate, copolymer of (meth)acrylate, acrylonitrile-methyl acrylate copolymer resin and the like, polycarbonate resins, polyurethane resins, vinyl chloride-vinyl acetate copolymer resin, polyvinylbutyral resin and the like; and derivatives and modifications thereof, polyisobutylene, polytetrahydrofuran, polyaniline, acrylonitrile-butadiene-styrene copolymer (ABS resin), polyamides such as nylon and the like, polyimides, polydienes such as polyisoprene, polybutadiene and the like, polysiloxanes such as polydimethylsiloxane and the like, polysulfones, polyimines, polyacetic anhydrides, polyureas, polysulfides, polyphosphazenes, polyketones, polyphenylenes, polyhaloolefins, and derivatives thereof. For example, the linear molecule may be selected from the group consisting of polyethylene glycol, polyisoprene, polyisobutylene, polybutadiene, polypropylene glycol, polytetrahydrofuran, polydimethylsiloxane, polyethylene, polypropylene, polyvinyl alcohol and polyvinyl methyl ether. In particular, the linear molecule may be polyethylene glycol.

A weight average molecular weight of the linear molecule may be 1,000 or more, preferably 3,000 to 100,000, more preferably 6,000 to 50,000.

Further, the acidic functional group or basic functional group provided at each end of the linear molecule, depending on a linear molecule used, a cyclic molecule(s) used, a first base or acid additional salt used and the like, is not particularly limited as long as it is stable and has a structure capable of penetrating a cavity (cavities) of a cyclic molecule(s) to be used.

Examples of the acidic functional group may include, but are not limited to, a carboxylic acid group, a sulfonic acid group, and a phosphoric acid group. As the acidic functional group, a carboxylic acid group is preferred.

Further, examples of the basic functional group may include, but are not limited to, a primary amine group, a secondary amine residue, a tertiary amine residue, an aniline residue, and a pyridine residue. As the basic functional group, a primary amine group is preferred.

In a case where a linear molecule having acidic or basic functional groups at both ends thereof is commercially available, the "preparation" of the step (A) may be carried out by purchasing the commercial product.

The "preparation" of the step (A) may be carried out by "preparing" a linear molecule having acidic or basic functional groups at both ends thereof.

In a case of "preparing", depending on the linear molecule to be used, the substance that should be acidic or basic functional group, and the like, the "preparation" of the step (A) can be carried out, for example, as follows:

The "preparation" of the step (A) can be carried out by a method for converting a group at the end of a linear molecule into an acidic or basic functional group. Specifically, the "preparation" of the step (A) can be carried out by oxidizing the hydroxyl group present at the end of a linear molecule with an existing oxidizing agent, and converting the group into a carboxylic acid group.

Further, the "preparation" of the step (A) can be carried out also by a method of reacting the group at the end of a linear molecule with a compound having an acidic functional group residue or basic functional group residue and releasing the acidic functional group or basic functional group. Specifically, the "preparation" of the step (A) can be carried out by reacting the hydroxyl group present at the end of a linear molecule with an acid anhydride compound, and imparting the released carboxylic acid group to the end.

<<Step (B)>>

The step (B) is a step of mixing the linear molecule prepared in the step (A), a cyclic molecule(s), and a first base or acid additional salt.

In this regard, an acid additional salt may be used in a case where the linear molecule has an acidic functional group, and a base additional salt may be used in a case where the linear molecule has a basic functional group.

(Cyclic Molecule)

The cyclic molecule is not limited, depending on a linear molecule, in particular, a linear molecule having acidic or basic functional groups at both ends, to be used, a first base additional salt or acid addition salt to be used, and the like, as long as the cyclic molecule may be cyclic, and may have a cavity, and a linear molecule is included in the cavity (cavities) of the cyclic molecules in a skewered manner.

The cyclic molecule may have, depending on characteristics of a desired pseudopolyrotaxane, a desired polyrotaxane, and a material comprising the desired pseudopolyrotaxane and/or the desired polyrotaxane, various groups.

The various groups may include, but are not limited to, 1) a hydrophobic modifying group such as a methoxy group, an ethoxy group, an acetyl group, a butylcarbamoyl group; 2) a group selected from the group consisting of —OH, —NH$_2$, —COOH, and —SH; 3) a polymerizable group selected from the group consisting of an acrylic group, a methacrylic group, a styryl group, a vinyl group, a vinylidene group, a polymeric group of a maleic anhydride containing functional group.

Furthermore, the various groups may bind directly to cyclic bone of the cyclic molecule, or bind to the cyclic molecule via a spacer group. The spacer group may be, but is not limited to, an alkylene group, an arylene group, a graft chain, a polymer derived from a monomer.

The cyclic molecule may be, for example, cyclodextrins selected from the group consisting of α-cyclodextrin, β-cyclodextrin and γ-cyclodextrin.

(First Base Additional Salt or First Acid Additional Salt)

A first base additional salt or a first acid additional salt, depending on a linear molecule to be used, in particular, a linear molecule having acidic or basic functional groups at both ends thereof, a cyclic molecule(s) to be used, and the like, is not particularly limited as long as it is an additional salt having an ability to control the inclusion rate to be described later.

Furthermore, in the step (B), a state in which the linear molecule is included in a cavity (cavities) of the cyclic molecule(s) in a skewered manner is formed. It is not bound to the perfect theory, but is considered that in this step (B), a first base additional salt or a first acid additional salt forms a weak bond with an acidic or basic functional group present at each end of the linear molecule, for example, a weak ionic bond, and that the first base additional salt or first acid additional salt is present in the vicinity of each end of the linear molecule due to the bond. Further, it is considered that when the first base additional salt or the first acid additional salt is present in the vicinity of each end of the linear molecule, the opportunity of including the linear molecule in a cyclic molecule(s) is inhibited, and thus the inclusion rate can be controlled.

Therefore, the inclusion rate can be controlled by the combination of the acidic or basic functional groups present at both ends of a linear molecule and the first base additional salts or the first acid additional salts.

In a case where the linear molecule comprises an acidic functional group, a first acid additional salt may be used as the first base additional salt or the first acid additional salt, and in a case where the linear molecule comprises a basic functional group, a first base additional salt may be used as the first base additional salt or the first acid additional salt.

Examples of a base component of the first base additional salt may include, but are not limited to, triethylamine, pyridine, ammonia, morpholine, t-butylamine, ethylenediamine, sodium hydroxide, potassium hydroxide, and the like.

Examples of an acid component of the first acid additional salt may include ones obtained by selecting from an inorganic acid and an organic acid.

Examples of the inorganic acid may include, but are not limited to, hydrochloric acid, hydrobromic acid, hydroiodic acid, nitric acid, sulfuric acid, phosphoric acid, and the like.

Further, examples of the organic acid may include, but are not limited to, formic acid, acetic acid, trifluoroacetic acid, propionic acid, hydroxyacetic acid, 2-hydroxypropionic acid, pamoic acid, 2-oxopropionic acid, oxalic acid, malonic acid, succinic acid, fumaric acid, maleic acid, malic acid, tartaric acid, citric acid, benzoic acid, salicylic acid, phthalic acid, cinnamic acid, glycolic acid, pyruvic acid, oxylic acid, salicylic acid, N-acetylcysteine, 2-butenedioic acid, methanesulfonic acid, ethanesulfonic acid, benzenesulfonic acid and toluenesulfonic acid, aspartic acid, glutamic acid, butyric acid, valeric acid, enanthic acid, capric acid, myristic acid, palmitic acid, stearic acid, lactic acid, sorbic acid, mandelic acid, and the like.

Examples of the first base or acid additional salt may include, but are not limited to, a base additional salt of adamantane carboxylic acid or an acid derivative thereof, a base additional salt of benzoic acid or a derivative thereof, a base additional salt of adamantane acetic acid or a derivative thereof, an acid additional salt of adamantane amine or a derivative thereof, an acid additional salt of adamantyl ethylenediamine, an acid additional salt of tritylamine, an acid additional salt of diisopropylethylamine, an acid additional salt of trimethylamine, and the like.

More specifically, in a case where the terminal functional group of the linear molecule is an acidic group such as a carboxylic acid group, an amine addition salt may be used. Examples of the amine addition salt may include an acid addition salt of a primary amine such as an alkylamine hydrochloride, an arylamine hydrochloride, a hydrochloride of adamantane amine or a derivative thereof, a hydrochloride of adamantyl ethylenediamine, a hydrochloride of tritylamine, a hydrochloride of diisopropylethylamine, a hydrochloride of triethylamine, or a hydrochloride of aniline or a derivative thereof; an acid additional salt of a secondary amine such as a dialkylamine hydrochloride; an addition salt of a tertiary amine such as a triethylamine hydrochloride, or a diisopropylethylamine hydrochloride; a hydrochloride of piperidine or a derivative thereof; a hydrochloride of morpholine or a derivative thereof; sulfonates of the amines described above; phosphates of the amines described above, and the like.

Further, in a case where the terminal functional group of the linear molecule is a basic group such as an amine group, a carboxylic acid additional salt can be used. Examples of the carboxylic acid addition salt may include a sodium salt of adamantane carboxylic acid or an acid derivative thereof, a sodium salt of benzoic acid or a derivative thereof, a sodium salt of adamantane acetic acid or a derivative thereof, a potassium salt, a triethylamine salt, a pyridine salt, an ammonium salt, a morpholine salt, a t-butylamine salt, an ethylenediamine salt, and the like of the carboxylic acid compound described above.

In the step (B), the first base additional salt or the first acid additional salt may be mixed in an amount of 2 to 50 molar equivalents, preferably 5 to 40 molar equivalents, and more preferably 10 to 20 molar equivalents relative to the total molar equivalent of the acidic functional groups or the basic functional groups of the linear molecule.

Furthermore, the total molar equivalent of the acidic functional groups or the basic functional groups of the linear molecule can be determined by the measurement of acid-base titration.

Further, in the step (B), the weight ratio of the linear molecule to the cyclic molecule(s) may be 1.0:1.0 to 1.0:5.0, preferably 1.0:1.0 to 1.0:3.5, more preferably 1.0:1.0 to 1.0:3.0.

The step (B) may be carried out by using a solvent.

As the solvent, a solvent capable of dissolving or dispersing the above-described linear molecule and cyclic molecule(s) may be used.

Examples of the solvent may include water, alcohol, dimethyl sulfoxide, dimethylacetamide, and a mixture thereof.

In particular, the step (B) is carried out preferably by using an aqueous solvent.

The term "aqueous solvent" is referred to as a solvent consisting of only water, and a mixed solvent of water and a solvent soluble in water. In this regard, examples of the solvent soluble in water may include, but are not limited to, methanol, ethanol, isopropyl alcohol, acetone, methyl ethyl ketone, dimethyl sulfoxide, dimethylacetamide, dimethylformamide, and the like.

The pseudopolyrotaxane obtained in the step (B) may be dried by an existing process to remove the solvent, or may also be in a state of containing the solvent. For example, the pseudopolyrotaxane in a state of containing the solvent may be, subsequently, used to produce a polyrotaxane described later.

By the steps (A) and (B), a pseudopolyrotaxane, in particular, a pseudopolyrotaxane having a controlled inclusion rate can be obtained.

<Production Method of Polyrotaxane>

The present application provides a method for producing a polyrotaxane, in which capping groups each locates at each end of a pseudopolyrotaxane, which has a linear molecule and a cyclic molecule(s) in which the linear molecule is included in a cavity (cavities) of the cyclic molecule(s) in a skewered manner, in order to prevent the dissociation of the cyclic molecule(s).

The method comprises:
the step (A);
the step (B); and
a step (C) of mixing the pseudopolyrotaxane obtained in the above step (B) and a capping group precursor(s), to provide capping groups at both ends of the linear molecule, to obtain the polyrotaxane.

The steps (A) and (B) are as described above, and thus the descriptions will be omitted.

<<Step (C)>>

The step (C) is a step of mixing the pseudopolyrotaxane obtained in the step (B) and a capping group precursor(s), to provide capping groups at both ends of the linear molecule.

(Capping Group Precursor)

The capping group precursor is not particularly limited, as long as it has a function of preventing the dissociation of a cyclic molecule(s) from the pseudopolyrotaxane by forming a capping group using the capping group precursor and by providing the capping group at each end of the linear molecule of the pseudopolyrotaxane.

For example, the capping group may be selected from the group consisting of dinitrophenyl groups; cyclodextrins; adamantane groups; trityl groups; fluoresceins; silsequioxanes; pyrenes; substituted benzenes (example of the substituent may include, but are not limited to, alkyl, alkyloxy, hydroxy, halogen, cyano, sulfonyl, carboxyl, amino, phenyl and the like. The substituent may be single or plural.); polycyclic aromatics which may be substituted (examples of the substituent may include, but are not limited to, those described above. The substituent may be single or plural.); and steroids. Preferably, the capping group may be selected from the group consisting of dinitrophenyl groups; cyclodextrins; adamantane groups; trityl groups; fluoresceins; silsequioxanes; and pyrenes, more preferably adamantane groups or cyclodextrins.

The capping group precursor is not particularly limited as long as it is a compound capable of forming the above-described capping group.

Furthermore, the capping group precursor may be a second base or acid additional salt that may also be the same as or different from the first base or acid additional salt. Further, the second base or acid additional salt can be selected from those described as the first base or acid additional salt.

For example, in a case where the first base or acid additional salt used in the step (B) is present in an amount sufficient to the amount of the functional group located at each end of the linear molecule and the first base or acid additional salt acts as a capping group precursor, the first base or acid additional salt may be used in the step (C) as a second base or acid additional salt that is a capping group precursor.

In addition, in a case where the first base or acid additional salt used in the step (B) does not act as a capping group precursor, a capping group precursor may be used separately, in the step (C).

By the steps (A), (B), and (C), a polyrotaxane, in particular, a polyrotaxane having a controlled inclusion rate can be obtained.

Furthermore, in the method for producing the pseudopolyrotaxane, additional steps may be provided before the step (A), between the step (A) and the step (B), and/or after the step (B).

Further, in the method for producing the polyrotaxane, additional steps may be provided before the step (A), between the step (A) and the step (B), between the step (B) and the step (C), and/or after the step (C).

Examples of the additional steps may include, but are not limited to, a drying step for removing a solvent, and a purifying step for removing inevitable impurities. Examples of the method for removing a solvent may include heat drying by a dryer, drying by a rotary evaporator, freeze drying, spraying drying, drum drying, drying using an azeotropic point of a mixed solvent, and the like. Examples of the purification method may include water washing, washing with warm water, a reprecipitation method, purification by separation membrane, liquid separation and the like.

The method according to the present application can obtain a pseudopolyrotaxane, in particular a pseudopolyrotaxane having controlled inclusion rate, a polyrotaxane, in particular a polyrotaxane having controlled inclusion rate.

The "inclusion rate" can be determined as follows:

The "inclusion rate" is the value representing the rate of the number of cyclic molecules ($\alpha$-CD) actually arranged relative to the number of cyclic molecules ($\alpha$-CD) arranged at the highest density in "raw material polyrotaxane A" and "modified polyrotaxane B". The maximum density (maximum inclusion amount) of $\alpha$-CD is determined by the length of the linear molecule and the thickness of the cyclic molecule. When the linear molecule is polyethylene glycol (PEG), it is obtained by the method described in Macromolecules 1993, 26, 5698-5703. Two repeating units of $-(O-CH_2-CH_2)_2-$ of polyethylene glycol correspond to the molecular thickness of $\alpha$-CD. For example, for a PEG with a number average molecular weight of 35000, the maximum inclusion amount of $\alpha$-CD is 35000/88=398. When 398 $\alpha$-CDs are included in a PEG with a number average molecular weight of 35000, the inclusion rate is 100%.

The "inclusion rate", in particular, the "inclusion rate of $\alpha$-CD" can be obtained from the ratio of the integrated value of H derived from $\alpha$-CD and H of PEG from $^1$H-NMR based on the H of PEG in the case of the above-described maximum inclusion amount of $\alpha$-CD.

The pseudopolyrotaxane, in particular the pseudopolyrotaxane having controlled inclusion rate, the polyrotaxane, in particular the polyrotaxane having controlled inclusion rate obtained by the method according to the present application can apply to a material comprising the same, a crosslinked body comprising the same and formed from the same, a material or a product comprising the crosslinked body.

Examples of the application may include, but are not limited to, pressure-sensitive adhesives and adhesives, scratch-resistant films, anti-vibration, damping, and isolation materials, paints, coating agents, sealants, ink additives and binders, electrical insulation materials, electrical and electronic component materials, optical materials, friction control agents, cosmetic materials, rubber additives, resin modifying and toughening agents, rheology control agents, thickeners, fibers, medical biomaterials, mechanical and automotive materials, building materials, and clothing and sporting goods.

EXAMPLES

Hereinafter, the present invention will be described in more detail by using, but not limited to, following examples.

(Synthesis Example 1) Synthesis of Terminal Carboxylic Acid Modified Polyethylene Glycol (Having a Weight Average Molecular Weight of 20,000)

10 g of PEG (having a weight average molecular weight of 20,000), 100 mg of TEMPO (2,2,6,6-tetramethyl-1-piperidinyloxy radical), and 1 g of sodium bromide were dissolved in 100 ml of water. Into the resulting solution, 5 ml of a commercially available sodium hypochlorite aqueous solution (having an effective chlorine concentration of around 5%) was added, and the resultant mixture was reacted while being stirred at a room temperature. When the reaction was started, the pH of the system rapidly decreased immediately after the addition, but the pH was adjusted by adding 1 N NaOH so as to be maintained at 10 to 11 preferably. The decrease in the pH was not observed roughly within 3 minutes, but the mixture was further stirred for 10 minutes. The reaction was terminated by adding 5 ml of ethanol. Extraction with 50 ml of methylene chloride was repeated three times to extract components other than inorganic salts, and then the methylene chloride was distilled off by an evaporator. The resulting material was dissolved in 250 ml of warm ethanol, and then the resulting mixture was placed in a freezer at −4° C. overnight to precipitate PEG-carboxylic acid, i.e., PEG, each end of which was replaced with carboxylic acid (—COOH). The precipitated PEG-carboxylic acid was recovered by centrifugation. The cycle of warm ethanol dissolution-precipitation-centrifugation was repeated several times. After the last cycle, vacuum drying was performed, to obtain PEG-carboxylic acid. The yield was 95% or more. The carboxylation rate was 99%.

Example 1-1

Deionized water (10 g) was added into $\alpha$-cyclodextrin (3.5 g), and the resultant mixture was stirred and dissolved at 70° C., and then allowed to cool to a room temperature. This solution was added into a solution in which 1 g of terminal carboxylic acid modified polyethylene glycol (having a weight average molecular weight Mw of 20,000) and adamantanamine hydrochloride (93.9 mg) had been dissolved in deionized water (11 g), and then the resultant mixture was stirred for 30 minutes under a room temperature. Then, the mixture was left to stand in a refrigerator at 5 to 10° C. for 15 hours. The obtained white solid in a gel state was freeze dried to obtain a pseudopolyrotaxane S-1.

Furthermore, the equivalent of the adamantanamine hydrochloride was 5.0 molar equivalents relative to the total molar equivalent of the carboxylic acid groups of the terminal carboxylic acid modified polyethylene glycol.

Example 1-2

The pseudopolyrotaxane S-1 (1 g) obtained in Example 1-1 was put into a sample tube, further 120.5 mg of 4-(4,6-dimethoxy-1,3,5-triazine-2-yl)-4-methylmorpholinium chloride n-hydrate (DMT-MM), 4-methylmorpholine (44 mg), and DMF (5 ml) were added, and the resultant mixture was stirred for 24 hours under a room temperature. In the obtained semi-solid material, DMSO was added until the semi-solid material was completely dissolved. Then, precipitation purification was carried out with deionized water. The obtained precipitate was freeze dried, to obtain a polyrotaxane P-1 (0.465 g).

Example 2-1

A pseudopolyrotaxane S-2 was obtained in a manner similar to Example 1-1 except that the amount of the adamantanamine hydrochloride was changed from 93.9 mg to 187.7 mg in Example 1-1.

Furthermore, the equivalent of the adamantanamine hydrochloride was 10 molar equivalents relative to the total molar equivalent of the carboxylic acid groups of the terminal carboxylic acid modified polyethylene glycol.

Example 2-2

A polyrotaxane P-2 (0.396 g) was obtained in a manner similar to Example 1-2 except that a pseudopolyrotaxane S-2 was used instead of the pseudopolyrotaxane S-1 in Example 1-2.

Example 3-1

A pseudopolyrotaxane S-3 was obtained in a manner similar to Example 1-1 except that the amount of the adamantanamine hydrochloride was changed from 93.9 mg to 375.4 mg in Example 1-1.

Furthermore, the equivalent of the adamantanamine hydrochloride was 20 molar equivalents relative to the total molar equivalent of the carboxylic acid groups of the terminal carboxylic acid modified polyethylene glycol.

Example 3-2

A polyrotaxane P-3a (0.230 g) was obtained in a manner similar to Example 1-2 except that a pseudopolyrotaxane S-3 was used instead of the pseudopolyrotaxane S-1 in Example 1-2.

Example 3-3

A polyrotaxane P-3b (0.436 g) was obtained in a manner similar to Example 3-2 except that acetonitrile (5 ml) was used instead of the DMSO (5 ml) in Example 3-2.

Example 4-1

A pseudopolyrotaxane S-4 was obtained in a manner similar to Example 1-1 except that the amount of the adamantanamine hydrochloride was changed from 93.9 mg to 750.8 mg in Example 1-1.

Furthermore, the equivalent of the adamantanamine hydrochloride was 40 molar equivalents relative to the total molar equivalent of the carboxylic acid groups of the terminal carboxylic acid modified polyethylene glycol.

Example 4-2

A polyrotaxane P-4b (0.315 g) was obtained in a manner similar to Example 1-2 except that a pseudopolyrotaxane S-4 was used instead of the pseudopolyrotaxane S-1 and that acetonitrile (5 ml) was used instead of the DMSO (5 ml) in Example 1-2.

Example 4-3

A polyrotaxane P-4c (0.368 g) was obtained in a manner similar to Example 4-2 except that a mixed solvent including hexane (15 g) and isopropyl alcohol (5 g) was used instead of the acetonitrile (5 ml) and that dialysis was performed by adding DMSO until the material was dissolved after removing the solvent under reduced pressure instead of the precipitation purification using deionized water in Example 4-2.

Example 5-1

A pseudopolyrotaxane S-5 was obtained in a manner similar to Example 1-1 except that a triethylamine hydrochloride (137.7 mg) was used instead of the adamantanamine hydrochloride (93.9 mg) in Example 1-1.

Furthermore, the equivalent of the triethylamine hydrochloride was 20 molar equivalents relative to the total molar equivalent of the carboxylic acid groups of the terminal carboxylic acid modified polyethylene glycol.

Example 5-2

The pseudopolyrotaxane S-5 (1 g) obtained in Example 5-1 was put into a sample tube, further adamantanamine hydrochloride (31.6 mg), DMT-MM (115.8 mg), 4-methylmorpholine (42.4 mg), and acetonitrile (5 ml) were added, and the resultant mixture was stirred for 24 hours under a room temperature. In the obtained semi-solid material, dimethyl sulfoxide was added until the semi-solid material was completely dissolved. Then, precipitation purification was carried out with deionized water. The obtained precipitate was freeze dried, to obtain a polyrotaxane P-5 (0.422 g).

Comparative Example 1-1

A pseudopolyrotaxane CS-1 was obtained in a manner similar to Example 1-1 except that the adamantanamine hydrochloride (93.9 mg) in Example 1-1 was not used.

Comparative Example 1-2

The pseudopolyrotaxane CS-1 (1 g) obtained in Comparative Example 1-1 was put into a sample tube, further adamantanamine hydrochloride (25 mg), DMT-MM (73.8 mg), 4-methylmorpholine (45 mg), and dimethylformamide (5 ml) were added. The resultant mixture was stirred for 24 hours under a room temperature. In the obtained semi-solid material, dimethyl sulfoxide was added until the semi-solid material was completely dissolved. Then, precipitation purification was carried out with deionized water. The obtained precipitate was freeze dried, to obtain a polyrotaxane CP-1 (0.758 g).

(Synthesis Example 2) Synthesis of Terminal Carboxylic Acid Modified Polyethylene Glycol (Having a Weight Average Molecular Weight of 11,000)

Terminal carboxylic acid modified polyethylene glycol (having a weight average molecular weight 11,000) was synthesized in a manner similar to Synthesis Example 1 except that 10 g of PEG (having a weight average molecular weight of 11,000) was used instead of the 10 g of PEG (having a weight average molecular weight of 20,000) in Synthesis Example 1.

Example 6-1

A pseudopolyrotaxane S-6 was obtained in a manner similar to Example 1-1 except that the terminal carboxylic acid modified polyethylene glycol (having a weight average molecular weight Mw of 11,000) obtained in Synthesis Example 2 was used instead of the terminal carboxylic acid modified polyethylene glycol (having a weight average molecular weight Mw of 20,000) obtained in Synthesis Example 1 and that an amount of the adamantanamine hydrochloride was changed from 93.5 mg to 170 mg in Example 1-1.

Furthermore, the equivalent of the adamantanamine hydrochloride was 5.0 molar equivalents relative to the total molar equivalent of the carboxylic acid groups of the terminal carboxylic acid modified polyethylene glycol.

Example 6-2

The pseudopolyrotaxane S-6 (1 g) obtained in Example 6-1 was put into a sample tube, further 4-(4,6-dimethoxy-1,3,5-triazine-2-yl)-4-methylmorpholinium chloride n-hydrate (DMT-MM) (120.5 mg), 4-methylmorpholine (44 mg), and a mixed solvent including hexane (15 g) and isopropyl alcohol (5 g) were added. The resultant mixture was stirred for 24 hours under a room temperature. The obtained semi-solid material was subjected to solvent removal by a rotary evaporator. In the obtained semi-solid material, DMSO was added until the semi-solid material was completely dissolved. Then, deionized water was added into the resultant mixture, the mixture was subjected to dialysis purification, and the freeze-dried solid was further washed with methylene chloride, to obtain a polyrotaxane P-6 (0.030 g).

Example 7-1

A pseudopolyrotaxane S-7 was obtained in a manner similar to Example 6-1 except that the amount of the adamantanamine hydrochloride was changed from 170 mg to 680 mg in Example 6-1.

Furthermore, the equivalent of the adamantanamine hydrochloride was 20 molar equivalents relative to the total molar equivalent of the carboxylic acid groups of the terminal carboxylic acid modified polyethylene glycol.

Example 7-2

A polyrotaxane P-7 (0.021 g) was obtained in a manner similar to Example 6-2 except that a pseudopolyrotaxane S-7 was used instead of the pseudopolyrotaxane S-6 in Example 6-2.

Example 8-2

A polyrotaxane P-8 (0.354 g) was obtained in a manner similar to Example 6-2 except that acetonitrile (5 ml) was used instead of the mixed solvent including hexane (15 g) and isopropyl alcohol (5 g) in Example 6-2.

Example 9-2

A polyrotaxane P-9 (0.235 g) was obtained in a manner similar to Example 6-2 except that a pseudopolyrotaxane S-7 was used instead of the pseudopolyrotaxane S-6 and that acetonitrile (5 ml) was used instead of the mixed solvent including hexane (15 g) and isopropyl alcohol (5 g) in Example 6-2.

Comparative Example 2-1

A pseudopolyrotaxane CS-2 was obtained in a manner similar to Example 6-1 except that the adamantanamine hydrochloride (93.9 mg) in Example 6-1 was not used.

Comparative Example 2-2

The pseudopolyrotaxane CS-2 (1 g) obtained in Comparative Example 2-1 was put into a sample tube, further adamantanamine hydrochloride (25 mg), DMT-MM (73.8 mg), 4-methylmorpholine (45 mg), and acetonitrile (5 ml) were added. The resultant mixture was stirred for 24 hours under a room temperature. In the obtained semi-solid material, dimethyl sulfoxide was added until the semi-solid material was completely dissolved. Then, precipitation purification was carried out with deionized water. The obtained precipitate was freeze dried, to obtain a polyrotaxane CP-2 (0.488 g).

(Synthesis Example 3) Synthesis of Terminal Carboxylic Acid Modified Polyethylene Glycol (Having a Weight Average Molecular Weight of 6,000)

Terminal carboxylic acid modified polyethylene glycol (having a weight average molecular weight of 6,000) was synthesized in a manner similar to Synthesis Example 1 except that 10 g of PEG (having a weight average molecular weight of 6,000) was used instead of the 10 g of PEG (having a weight average molecular weight of 20,000) in Synthesis Example 1.

Example 10-1

Deionized water (10 g) was added into α-cyclodextrin (3.5 g), and the resultant mixture was stirred and dissolved at 70° C., and then allowed to cool to a room temperature. This solution was added into a solution in which 1 g of terminal carboxylic acid modified polyethylene glycol (having a weight average molecular weight Mw of 6,000), and adamantanamine hydrochloride (156.4 mg) had been dissolved in deionized water (11 g). Then, the resultant mixture was stirred for 30 minutes under a room temperature. Then, the mixture was left to stand in a refrigerator at 5 to 10° C. for 15 hours. The obtained white solid in a gel state was freeze dried, to obtain a pseudopolyrotaxane S-10.

Furthermore, the equivalent of the adamantanamine hydrochloride was 2.5 molar equivalents relative to the total molar equivalent of the carboxylic acid groups of the terminal carboxylic acid modified polyethylene glycol.

Example 10-2

The pseudopolyrotaxane S-10 (1 g) obtained in Example 10-1 was put into a sample tube, further 4-(4,6-dimethoxy-1,3,5-triazine-2-yl)-4-methylmorpholinium chloride n-hydrate (DMT-MM) (120.5 mg), 4-methylmorpholine (44 mg), and a mixed solvent including hexane (15 g) and isopropyl alcohol (5 g) were added. The resultant mixture was stirred for 24 hours under a room temperature. The obtained semi-solid material was subjected to solvent removal by a rotary evaporator. In the obtained semi-solid material, DMSO was added until the semi-solid material was completely dissolved. Then, deionized water was added into the resultant mixture, the mixture was subjected to dialysis purification, and the freeze-dried solid was further washed with methylene chloride, to obtain a polyrotaxane P-10 (0.038 g).

Example 11-1

A pseudopolyrotaxane S-11 was obtained in a manner similar to Example 10-1 except that the amount of the adamantanamine hydrochloride was changed from 156.4 mg to 312.8 mg in Example 10-1.

Furthermore, the equivalent of the adamantanamine hydrochloride was 5 molar equivalents relative to the total molar equivalent of the carboxylic acid groups of the terminal carboxylic acid modified polyethylene glycol.

Example 11-2

A polyrotaxane P-11 (0.038 g) was obtained in a manner similar to Example 10-2 except that a pseudopolyrotaxane S-11 was used instead of the pseudopolyrotaxane S-10 in Example 10-2.

Comparative Example 3-1

A pseudopolyrotaxane CS-3 was obtained in a manner similar to Example 10-1 except that the adamantanamine hydrochloride (156.4 mg) in Example 10-1 was not used.

Comparative Example 3-2

The pseudopolyrotaxane CS-3 (1 g) obtained in Comparative Example 3-1 was put into a sample tube, further adamantanamine hydrochloride (25 mg), DMT-MM (73.8 mg), 4-methylmorpholine (45 mg), and a mixed solvent including hexane (15 g) and isopropyl alcohol (5 g) were added. The resultant mixture was stirred for 24 hours under a room temperature. The obtained semi-solid material was subjected to solvent removal by a rotary evaporator. In the obtained semi-solid material, dimethyl sulfoxide was added until the semi-solid material was completely dissolved. Then, precipitation purification was carried out with deionized water. The obtained precipitate was freeze dried to obtain a polyrotaxane CP-3 (0.137 g).

Example 12-1

Deionized water (20 g) was added into 2 g of 1-adamantane carboxylic acid (available from Tokyo Chemical Industry Co., Ltd.). The resultant mixture was stirred and dissolved under a room temperature, and then into the mixture, 444 mg of sodium hydroxide (available from Wako Pure Chemical Industries, Ltd.) was added. The obtained mixture was further stirred for 1 hour. The obtained solution was dried under reduced pressure, to obtain an adamantane carboxylic acid sodium salt (2.4 g).

Example 12-2

Deionized water (2 g) was added into α-cyclodextrin (0.7 g), and the resultant mixture was stirred and dissolved at 70° C., and then allowed to cool to a room temperature. This solution was added into a solution in which 0.2 g of terminal amine modified polyethylene glycol (having a weight average molecular weight Mw of 20,000, manufactured by Aldrich) and an adamantane carboxylic acid sodium salt (40.7 mg) had been dissolved in deionized water (2.22 g). Then, the resultant mixture was stirred for 30 minutes under a room temperature. Then, the mixture was left to stand in a refrigerator at 5 to 10° C. for 15 hours. The obtained white solid in a gel state was freeze dried, to obtain a pseudopolyrotaxane S-12.

Furthermore, the equivalent of the adamantane carboxylic acid sodium salt was 10 molar equivalents relative to the total molar equivalent of the amine groups of the terminal amine modified polyethylene glycol.

Example 12-3

The pseudopolyrotaxane S-12 (0.5 g) obtained in Example 12-2 was put into a sample tube, further 4-(4,6-dimethoxy-1,3,5-triazine-2-yl)-4-methylmorpholinium chloride n-hydrate (DMT-MM) (58.8 mg), and acetonitrile (2.3 ml) were added. The resultant mixture was stirred for 24 hours under a room temperature. In the obtained semi-solid material, DMSO was added until the semi-solid material was completely dissolved. Then, precipitation purification was carried out with deionized water. The obtained precipitate was freeze dried, to obtain a polyrotaxane P-12 (53.3 mg).

Comparative Example 4-1

A pseudopolyrotaxane CS-4 was obtained in a manner similar to Example 12-1 except that the adamantane carboxylic acid sodium salt (40.7 mg) in Example 12-1 was not used.

Comparative Example 4-2

The pseudopolyrotaxane CS-4 (0.5 g) obtained in Comparative Example 4-1 was put into a sample tube, further adamantane carboxylic acid (11.3 mg), DMT-MM (61.5 mg), 4-methylmorpholine (22.5 mg), and acetonitrile (5 ml) were added. The resultant mixture was stirred for 24 hours under a room temperature. In the obtained semi-solid material, dimethyl sulfoxide was added until the semi-solid material was completely dissolved. Then, precipitation purification was carried out with deionized water. The obtained precipitate was freeze dried, to obtain a polyrotaxane CP-4 (0.211 g).

Inclusion rates of the polyrotaxanes P-1 to P-12 and CP-1 to CP-4 obtained in the above Examples and Comparative Examples were determined by $^1$H-NMR measurement. The results are shown in Tables 1 to 4.

Figure 2:
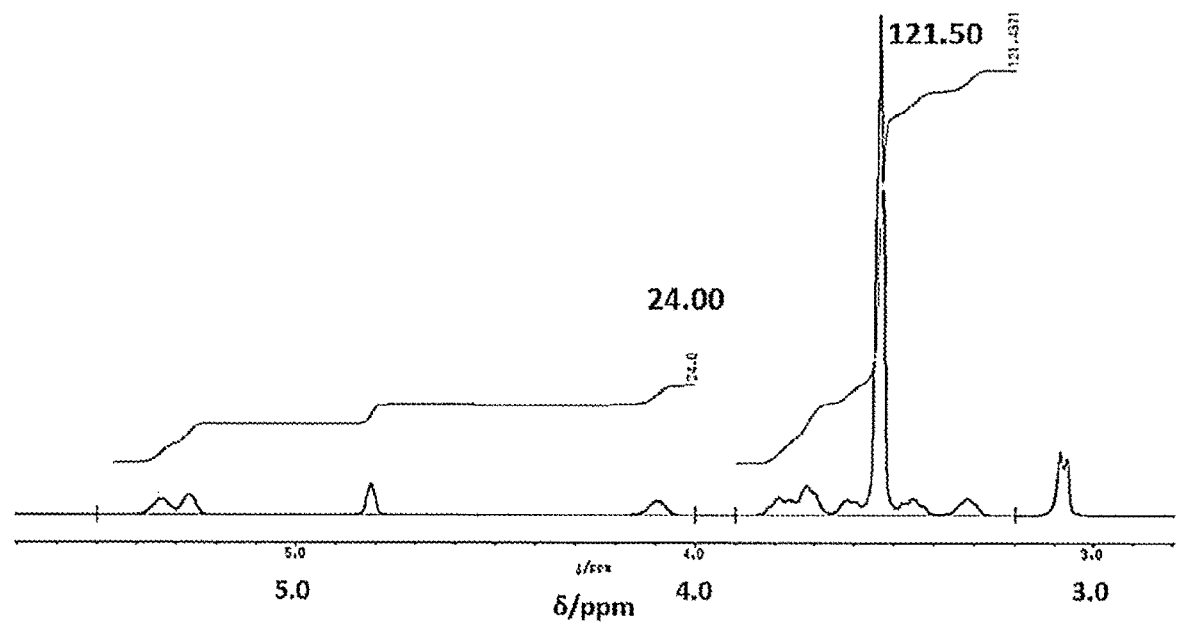
FIG. 2 shows a $^1$H-NMR spectrum of the polyrotaxane P-4c obtained by Example 4-3.

As described above, the inclusion rate was measured by $^1$H-NMR, specifically, by dissolving the obtained polyrotaxane in DMSO-d$^6$, performing the measurement at 80° C., and determining an integral value of from 3.2 to 3.9 ppm (H other than the CH2 of ethylene oxide and the hydroxyl group and C1 of α-cyclodextrin) when an integral value of from 4.0 to 5.5 ppm (H of the hydroxyl group of α-cyclodextrin and H of the C1 of α-cyclodextrin) was taken as 24. As a specific example, a $^1$H-NMR spectrum of the polyrotaxane P-4c obtained in Example 4-3 is shown in FIG. 2. When the integral value of from 4.0 to 5.5 ppm was taken as 24 in FIG. 2, an integral value of from 3.2 to 3.9 ppm was 75.8, and according to these values and the above-described definition of the inclusion rate, the inclusion rate was calculated to be (8×100)/(121.50−36)=9.4.

Furthermore, in Tables 1 to 4, "molar ratio of acid additional salt to carboxylic acid group", type of "acid additional salt" or "base additional salt", "solvent used in step (C)" (shown as "solvent in step (C)" in Tables), and "molecular weight of polyrotaxane Mw" (Mw: weight average molecular weight) are also shown. In this regard, the weight average molecular weight was measured by GPC (HLC-8220GPC, TSK guard column Super AW-H manufactured by Tosoh Corporation, conditions: DMSO/0.01 M LiBr eluent, column oven at 50° C., and flow rate at 0.5 ml/min).

Further, a graph in which the "molar ratio of acid additional salt to carboxylic acid group" in Table 1 is shown on the horizontal axis and the "inclusion rate" in Table 1 is shown on the vertical axis, is shown in FIG. 1.

Tables 1 to 4 show that the inclusion rate of the polyrotaxane obtained by carrying out an inclusion step by using the acid additional salt or base additional salt according to the present invention is lower than the inclusion rate of the polyrotaxane obtained by carrying out an inclusion step without using the acid additional salt or base additional salt.

Specifically, Table 1 shows that in a case where the inclusion step was carried out without using the acid additional salt according to the present invention (Comparative Example 1-2), the inclusion rate was 30.9%, but in a case where the inclusion step was carried out by using the acid additional salt according to the present invention (Examples 1-2 to 5-2), the inclusion rate was a low inclusion rate of 9.4 to 24.7%.

Further, as is apparent from FIG. 1, it can be understood that the inclusion rate can be changed and controlled by changing an amount of the acid additional salt. More, it can be understood that the inclusion rate of the obtained polyrotaxane tends to decrease along with the addition amount under the same conditions.

Table 2 shows that in a case where the inclusion step was carried out without using the acid additional salt according to the present invention (Comparative Example 2-2), the inclusion rate was 31.1%, but in a case where the inclusion step was carried out by using the acid additional salt according to the present invention (Examples 6-2 to 9-2), the inclusion rate was a low inclusion rate of 9.06 to 19.9%. Further, also as to the tendency of the addition amount, as with Table 1, it can be understood that the inclusion rate of the obtained polyrotaxane tends to decrease along with the addition amount.

Table 3 shows that in a case where the inclusion step was carried out without using the acid additional salt according to the present invention (Comparative Example 3-2), the inclusion rate was 18.7%, but in a case where the inclusion step was carried out by using the acid additional salt according to the present invention (Examples 10-2 to 11-2), the inclusion rate was a low inclusion rate of 12.8 to 15.0%. Further, also as to the tendency of the addition amount, as with Table 1, it can be understood that the inclusion rate of the obtained polyrotaxane tends to decrease along with the addition amount.

Table 4 shows that in a case where the inclusion step was carried out without using the base additional salt according to the present invention (Comparative Example 4-2), the inclusion rate was 33.1%, but in a case where the inclusion step was carried out by using the base additional salt according to the present invention (Example 12-3), the inclusion rate was a low inclusion rate of 25.4%.

Therefore, by the production method including an inclusion step using the acid additional salt or the base additional salt according to the present invention, a polyrotaxane or a pseudopolyrotaxane, each having a controlled low inclusion rate, can be provided, and the crosslinked body using the polyrotaxane having the controlled low inclusion rate can provide characteristics different from those of the conventional crosslinked body using a polyrotaxane having a relatively high inclusion rate.

TABLE 1

P-1 to P-5 and CP-1, in which molecular weight of the linear molecule in polyrotaxane is 20,000

| Polyrotaxane | Molar ratio of acid additional salt to carboxylic acid group | Acid additional salt | Solvent in step (C) | Molecular weight of Polyrotaxane Mw | Inclusion rate % |
|---|---|---|---|---|---|
| CP-1 | 0 | — | DMF | 120224 | 30.9 |
| P-1 | 5 | Adamantan-amine hydrochloride | | 104808 | 24.7 |
| P-2 | 10 | | | 99958 | 23.5 |
| P-3a | 20 | | | 83091 | 22.3 |
| P-3b | 20 | | Acetonitrile | 76635 | 21.2 |
| P-4b | 40 | | Acetonitrile | 71590 | 19.6 |
| P-4c | 40 | | Hexane/IPA | 64264 | 9.4 |
| P-5 | 20 | Triethylamine hydrochloride | Acetonitrile | 103135 | 24.2 |

TABLE 2

P-6 to P-9 and CP-2, in which molecular weight of the linear molecule in polyrotaxane is 11,000

| Polyrotaxane | Molar ratio of acid additional salt to carboxylic acid group | Acid additional salt | Solvent in step (C) | Molecular weight of Polyrotaxane Mw | Inclusion rate % |
|---|---|---|---|---|---|
| P-6 | 5 | Adamantanamine hydrochloride | Hexane/IPA | 33300 | 10.1 |
| P-7 | 20 | | Hexane/IPA | 29500 | 9.06 |
| P-8 | 5 | | Acetonitrile | 39000 | 19.9 |
| P-9 | 20 | | Acetonitrile | 34800 | 18.1 |
| CP-2 | 0 | — | | 49600 | 31.1 |

TABLE 3

P-10 to P-11 and CP-3, in which molecular weight of the linear molecule in polyrotaxane is 6,000

| Polyrotaxane | Molar ratio of acid additional salt to carboxylic acid group | Acid additional salt | Solvent in step (C) | Molecular weight of Polyrotaxane Mw | Inclusion rate % |
|---|---|---|---|---|---|
| P-10 | 2.5 | Adamantanamine hydrochloride | Hexane/IPA | 29400 | 15.0 |
| P-11 | 5 | | Hexane/IPA | 26700 | 12.8 |
| CP-3 | 0 | — | | 33700 | 18.7 |

TABLE 4

P-12 and CP-4, in which molecular weight of the linear molecule in polyrotaxane is 20,000, and in which the end groups of the linear molecule are amine group.

| Polyrotaxane | Molar ratio of base additional salt to amine group | Base additional salt | Solvent in step (C) | Molecular weight of Polyrotaxane Mw | Inclusion rate % |
|---|---|---|---|---|---|
| P-12 | 10 | Adamantane carboxylic acid sodium salt | Acetonitrile | 91200 | 25.4 |
| CP-4 | 0 | — |  | 103497 | 33.1 |

What is claimed is:

1. A method for producing a pseudopolyrotaxane, which has a linear molecule and a cyclic molecule(s) in which the linear molecule is included in a cavity (cavities) of the cyclic molecule(s) in a skewered manner, the method comprising the steps of:
   (A) preparing a linear molecule having acidic or basic functional groups at both ends; and
   (B) mixing the linear molecule, a cyclic molecule(s), and a first base addition salt or acid addition salt (the first acidic addition salt in a case of the linear molecule having the acidic functional group, and the first base addition salt in a case of the linear molecule having the basic functional group);
   to form the pseudopolyrotaxane.

2. A method for producing a polyrotaxane, in which capping groups each locates at each end of a pseudopolyrotaxane, which has a linear molecule and a cyclic molecule(s) in which the linear molecule is included in a cavity (cavities) of the cyclic molecule(s) in a skewered manner, in order to prevent the dissociation of the cyclic molecule(s), the method comprising the steps of:
   (A) preparing a linear molecule having acidic or basic functional groups at both ends;
   (B) mixing the linear molecule, a cyclic molecule(s), and a first base addition salt or acid addition salt (the first acidic addition salt in a case of the linear molecule having the acidic functional group, and the first base addition salt in a case of the linear molecule having the basic functional group), to form the pseudopolyrotaxane; and
   (C) mixing the resulting pseudopolyrotaxane and a capping group precursor(s);
   to obtain the polyrotaxane.

3. The method according to claim 1, wherein the first base addition salt or acid addition salt is at least one selected from the group consisting of a base addition salt of adamantane carboxylic acid or an acid derivative thereof, a base addition salt of benzoic acid or a derivative thereof, a base addition salt of adamantane acetic acid or a derivative thereof, an acid addition salt of adamantane amine or a derivative thereof, an acid addition salt of adamantyl ethylenediamine, an acid addition salt of tritylamine, an acid addition salt of diisopropylethylamine, and an acid addition salt of triethylamine.

4. The method according to claim 1, wherein the linear molecule comprises acidic functional groups at both ends.

5. The method according to claim 1, wherein the linear molecule comprises basic functional groups at both ends.

6. The method according to claim 4, wherein 2 to 50 molar equivalents of the first acid addition salt is mixed to the total molar equivalent of the acidic functional groups of the linear molecule in the step (B).

7. The method according to claim 1, wherein the step (B) is carried out in the presence of an aqueous solvent.

8. The method according to claim 1, wherein the capping group precursor(s) is a second base addition salt or acid addition salt.

9. The method according to claim 1, wherein the cyclic group is at least one selected from cyclodextrins.

10. The method according to claim 2, wherein the first base addition salt or acid addition salt is at least one selected from the group consisting of a base addition salt of adamantane carboxylic acid or an acid derivative thereof, a base addition salt of benzoic acid or a derivative thereof, a base addition salt of adamantane acetic acid or a derivative thereof, an acid addition salt of adamantane amine or a derivative thereof, an acid addition salt of adamantyl ethylenediamine, an acid addition salt of tritylamine, an acid addition salt of diisopropylethylamine, and an acid addition salt of triethylamine.

11. The method according to claim 5, wherein 2 to 50 molar equivalents of the first base addition salt is mixed to the total molar equivalent of the basic functional groups of the linear molecule in the step (B).

12. The method according to claim 2, wherein the linear molecule comprises acidic functional groups at both ends.

13. The method according to claim 12, wherein 2 to 50 molar equivalents of the first acid addition salt is mixed to the total molar equivalent of the acidic functional groups of the linear molecule in the step (B).

14. The method according to claim 2, wherein the linear molecule comprises basic functional groups at both ends.

15. The method according to claim 14, wherein 2 to 50 molar equivalents of the first base addition salt is mixed to the total molar equivalent of the basic functional groups of the linear molecule in the step (B).

16. The method according to claim 2, wherein the step (B) is carried out in the presence of an aqueous solvent.

17. The method according to claim 2 wherein the capping group precursor(s) is a second base addition salt or acid addition salt.

18. The method according to claim 2, wherein the cyclic group is at least one selected from cyclodextrins.

* * * * *